July 31, 1962   V. DURBIN   3,047,188
COOKING UTENSIL
Filed Feb. 11, 1960   2 Sheets-Sheet 1

INVENTOR.
VERNON DURBIN
BY
James and Franklin
ATTORNEYS

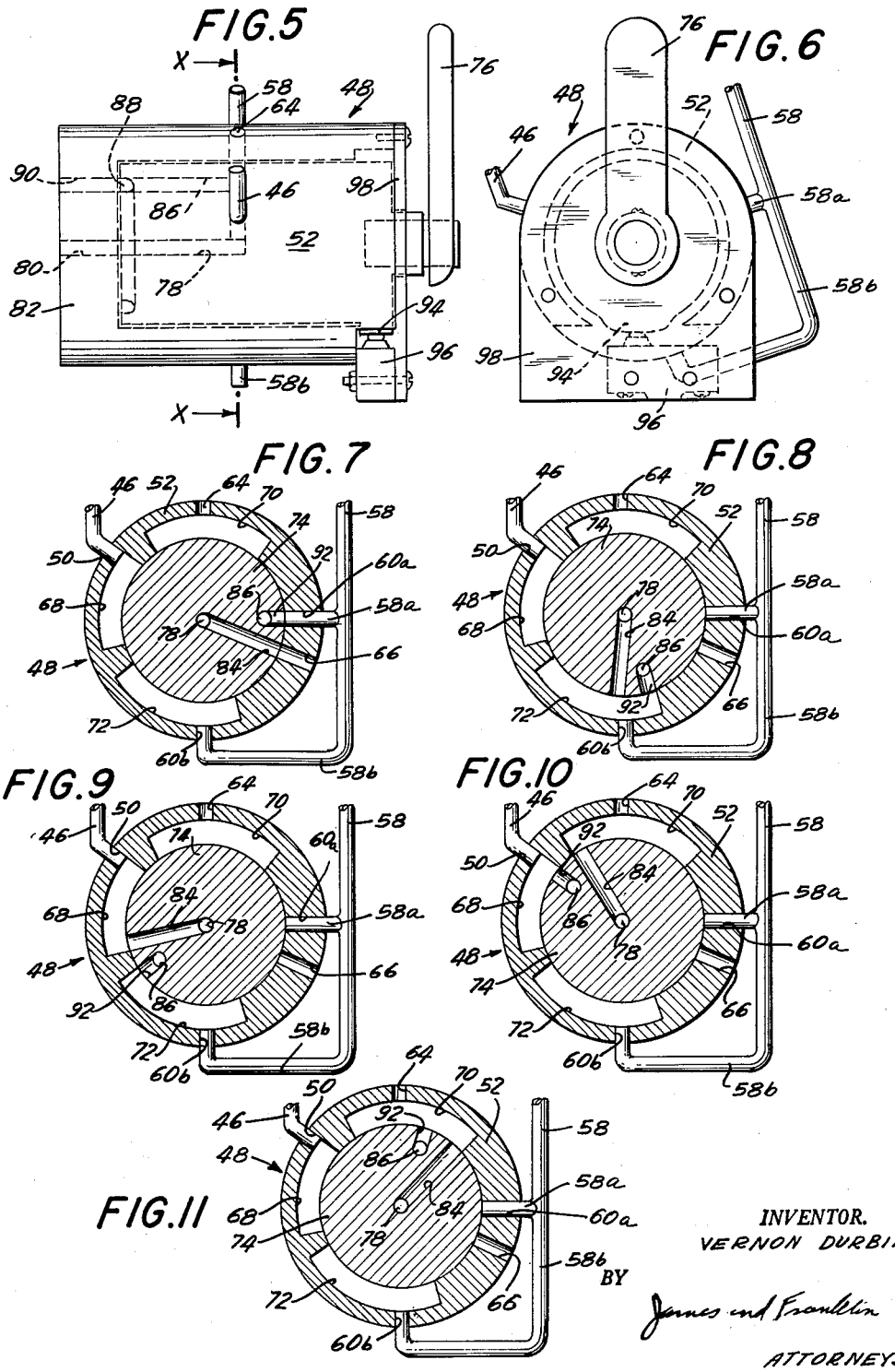

United States Patent Office 3,047,188
Patented July 31, 1962

3,047,188
COOKING UTENSIL
Vernon Durbin, Waban, Mass., assignor to Holtyer-Cabot Corporation, a corporation of Delaware
Filed Feb. 11, 1960, Ser. No. 8,111
14 Claims. (Cl. 220—63)

The present invention relates to an improvement in cooking utensils.

Manual cleaning of pots and pans is a household chore which, thus far, has not capitulated to the advance of technology. Dishes and glasses may be placed in a washing machine and satisfactorily cleansed. The same does not hold true of pots, pans, casseroles and the like, particularly those in which food has been baked or fried. The cooking residues unavoidably inherent in such operations are not readily removable, and yield only to prolonged scouring with special implements and materials.

A second all too frequent cooking difficulty is the tendency of baked products, such as cakes and pies, to stick to the pans in which they are baked and resist removal therefrom in one piece.

The use of aluminum foil or other thin metallic material as a lining for cooking utensils has been previously proposed. It has the advantage that the foil represents a disposable item upon which the cooking residues are deposited and which, when stripped from the utensil and thrown away, renders it unnecessary to clean the utensil at all. It has the further advantage that after baking the foil is more readily removable from the utensil together with its contents such as a cake, than the contents alone would have been in the absence of the foil.

Unfortunately, this procedure has proved satisfactory only in connection with a limited number of cooking operations. The drip-pan of a broiler may advantageously be lined with foil, and certain food items, such as potatoes to be baked or boiled, may be wrapped in foil before cooking. However, the use of foil as a liner for frying or baking pans, or in conjunction with any utensils to be used in a cooking operation in which heat is to be transmitted directly through the utensil to the food contained therein, has not been considered feasible.

The primary reasons is that the foil sheet cannot manually be shaped to have a smooth, uniform fit within the utensil, in intimate contact with the entire inner surface thereof. It is extremely time-consuming and frustratingly futile, to attempt to snugly line a utensil with a sheet of foil. If the foil is not in uniform contact with the inner surface of the utensil, air pockets will exist between portions of the foil and the utensil, and those air pockets actually represent areas of thermal insulation. Thus the contents of the utensil will not be uniformly heated. Moreover, when it is necessary to stir the food within the utensil or lift it or turn it, as when scrambling or frying eggs, for example, the necessary movements of a spoon or spatula will tend to rupture the foil at the upwardly bulging areas thereof, thus destroying its utility as a utensil protector.

If an attempt is made to supply preformed inserts of fairly thin metal, each of a shape and size to fit a given utensil, a sufficiently accurate mating of the liner and utensil can be attained only when the material of which the liner is formed is sufficiently thick to have a substantial degree of inherent rigidity, and in such a case the cost of the liner would be so great that it could not be considered expendable. Moreover, different units would be required for each size and shape of utensil, thus further increasing the cost and reducing the adaptability of the arrangement.

I have, in my application Ser. No. 399,975 entitled, "Cooking Utensil," filed December 23, 1953, now Patent No. 2,939,606 and assigned to the assignee of this application, disclosed a utensil with which liners of thin foil may be employed for frying, baking or the like, without any of the disadvantages outlined above. Proper fitting of the foil within the utensil is achieved by sealing the rim of the liner to the utensil and then applying suction within the sealed space between the liner and the inner surface of the utensil so as to positively force the liner into intimate and uniform contact with the inner utensil surface. To assist in separating the liner from the utensil after cooking has been completed pressure is applied inside the utensil against the outer surface of the liner, thus forcibly separating the liner from the utensil.

The instant invention represents an improvement over the structure and arrangement shown and claimed in the aforementioned application Ser. No. 399,975.

In the structure disclosed in the aforementioned application the foil liner is sealed to the utensil by having its rim compressed between the utensil proper and a structural clamping ring mounted on the utensil. This clamping ring adds materially to the size, weight and cost of the utensil. All of these factors are of appreciable importance, particularly where the ordinary home or ordinary housewife are concerned. In addition, even when a clamping ring is employed in connection with a utensil of the type under discussion, that ring must, for best results, be utilized in conjunction with a deformable sealing ring also carried by the utensil, the clamping ring pressing the rim of the foil liner into the sealing ring to produce the necessary seal completely around the liner. Such sealing rings are subject to deterioration, particularly in view of the high temperatures to which they are subjected during the cooking operation.

There is also the possibility that the rim of the liner might adhere to portions of the utensil surface against which that rim is pressed, thus making somewhat troublesome the separation of the liner from the utensil.

The present invention has as its primary objective the complete elimination of the clamping ring and sealing ring formerly employed. The seal between the rim of foil liner and the rim-supporting surface of the utensil body is achieved by means of suction and not mechanically, special passages being provided in the utensil body to permit suction to be applied to that surface of the utensil on which the liner rim is adapted to rest. The seal thus produced by suction preferably is achieved in advance of the time that suction is applied in the space between the cooking surface of the utensil and the liner in order to draw the body of the liner closely thereagainst. To aid in the effectuation of the initial seal around the rim of the liner, the under surface of that liner rim may be provided with a thin coating of rubber-like material. A single control means is provided for sequentially controlling the application of suction over the desired surfaces of the utensil.

When pneumatic pressure is employed to facilitate the removal of the liner from the utensil after cooking, the same control means can selectively control the application of pressure to the appropriate utensil surfaces, and through the same passages used to apply suction, in a sequential manner in order to achieve a complete and rapid separation of the liner from the utensil.

The present invention permits the utensil to be made smaller, so that it may be stored more conveniently, to be made lighter so that it may be handled more easily, and to be manipulated more conveniently, the manipulation being limited merely to the insertion of the liner within the utensil followed by sequential movement of a single manually accessible handle or knob which actuates the control means.

To the accomplishment of the above, and to such other objects as may hereinafter appear, the present invention relates to a cooking utensil assembly as defined in the appended claims and as described in this specification, taken together with the accompanying drawings, in which:

FIG. 5 is a side elevational view of the combination valve and switch control means;

FIG. 6 is an end elevational view of the control means of FIG. 5; and

Figure 1:
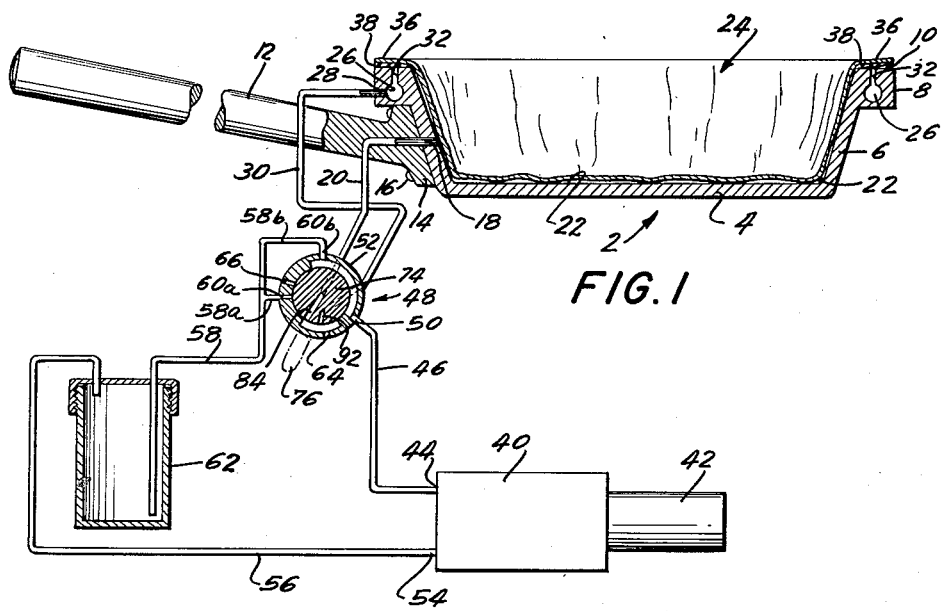
FIG. 1 is a schematic view of a utensil and the suction and pressure system to be used in conjunction therewith, the utensil being shown partially cross-sectioned and with a liner in position but before suction has been applied.

FIGS. 7-11 are cross-sectional views taken along the line X—X of FIG. 5 and showing the positions of the valve respectively for: (7) applying suction only at the rim of the utensil, (8) providing suction both at the rim and over the cooking surface of the utensil, (9) applying suction at the rim of the utensil and pressure at the cooking surface thereof, (10) applying pressure at the rim of the utensil, and (11) connecting both the rim and the cooking surface of the utensil to atmospheric pressure.

The utensil of the present invention, generally designated 2, is here shown in the form of a frying pan, but it will be obvious that its particular shape or purpose may be widely varied therefrom. It comprises a bottom wall 4 and side walls 6 which terminate in an outwardly extending upper wall 8 having an upwardly facing rim-supporting surface 10. A handle 12 has a base plate 14 which is secured to a portion of the side wall 6 by means or rivets or the like 16. A hollow tube 18 or other type of conduit 18 passes through the handle 12 and the side wall 6, the outer end of the tube 18 having a flexible tube 20 connected thereto. The inner end of the tube 18 opens onto the interior or cooking surface 22 of the utensil. In order to secure substantially uniform application of suction or pressure over the entire cooking surface 22 of the utensil, a series of communicating grooves, preferably V-shape in cross-section, may be provided on the surface 22, those grooves communicating with the inner end of the tube 18. The width of these grooves must be sufficiently small in relation to the material of which the liner, generally designated 24, is formed so that the application of suction will not cause the liner 24 to enter and plug any of those grooves. A rule of thumb is that the grooves should be only about three times as wide as the liner is thick.

Figure 4:
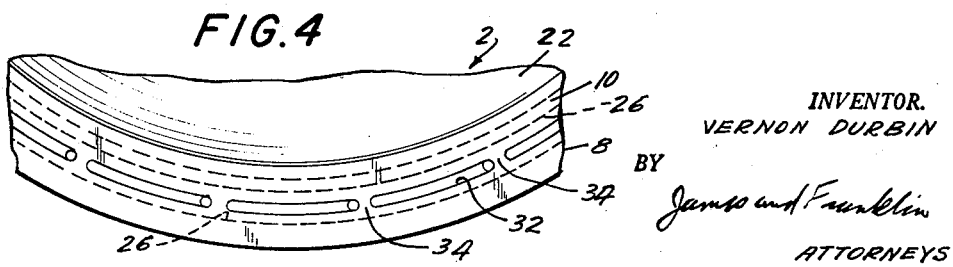
FIG. 4 is a fragmentary top plan view of the rim portion of the utensil, taken along the line 4—4 of FIG. 3.

A passage 26 is formed within and extends completely around the upper wall 8, and a tube or other type of conduit 28 passes through the upper wall 8 and communicates between the passage 26 and the exterior of the utensil, a flexible tube 30 being connected to the outer end of the tube 28. A series of auxiliary passages 32 extend up from the passage 26 and open onto the rim-supporting surface 10. As may best be seen from FIG. 4, the auxiliary passages 32 extend arcuately along the surface 10 and collectively encircle the utensil cooking surface 22, but they are spaced from one another for short distances at 34.

The liner 24 is of the same general type as that disclosed in my prior aplication Ser. No. 399,975. It may be formed of any suitable material, such as thin aluminum foil, preferably having a thickness of .002 inch or less, in order that its cost may be minimized. A sheet of this material of suitable size is preliminarily and approximately formed into the shape of the interior of the utensil 2, the edges thereof being crinkled in a manner comparable to the edges of paper drinking cups in common use today in order to achieve the desired peripheral configuration. The rim thereof, designated by the reference numeral 36, is flattened so that it will fit over the rim-supporting surface 10 of the utensil 2 when the liner 24 is dropped into the utensil. If desired, the rim 36 of the liner may be folded back on itself in order to impart a greater degree of rigidity to the liner. The lower surface of the rim 36 may be coated with a thin layer 38 of rubber or other deformable plastic material, which will not add appreciably to its cost but which will significantly assist in obtaining a proper rim seal.

A combined pressure and suction pump 40 is adapted to be driven by motor 42. Means are provided for selectively connecting the utensil passages 18 and 32 to pressure and suction respectively. In the embodiment here specifically disclosed the pressure outlet 44 of the pump 40 is connected by tube 46 to the control valve generally designated 48, the tube 46 passing through an aperture 50 in the stationary side wall 52 of the valve 48. The suction outlet 54 of the pump 40 is connected by tubes 56 and 58 to the valve 48, the tube 58 ending in a pair of branches 58a and 58b which extend through apertures 60a and 60b respectively in the valve side wall 52. A trap 62 may be interposed between the tubes 56 and 58. The tubes 46, 56 and 58, or parts of them, may be flexible. Apertures 64 and 66 are also formed in the valve side wall 52, communicating with the atmosphere. Elongated arcuate recesses 68, 70 and 72 are provided on the inner surface of the valve side wall 52 communicating with the tube 46, the aperture 64 and the tube 58b respectively.

Rotatably and sealingly mounted within the valve side wall 52 is a rotor 74 secured in any appropriate manner to external control handle 76 so as to be rotated thereby. The rotor 74 is provided with a central passage 78 which communicates with passage 80 formed in the fixed bottom wall 82 of the valve 48, the tube 20 also communicating with the outer end of the passage 80. The upper end of the passage 78 communicates with horizontal rotor passage 84 which extends out to the periphery of the rotor 74. A second vertical passage 86 is formed in the rotor 74, this communicating at its lower end with a circular recess 88 formed at the bottom of the rotor 74, that recess 88 communicating with passage 90 in the valve bottom wall 82, the tube 30 being connected to the outer end of the passage 90. At its upper end the rotor passage 86 communicates with a horizontal rotor passage 92 which extends to the periphery of the rotor 74.

The upper end of the rotor 74 carries a cam 94 which acts upon a switch 96 carried by the top plate 98 of the valve 48, that top plate 98 also serving to axially retain the rotor 74 in position within the side wall 52 and resting on the bottom wall 82. The switch 96 is electrically connected to the motor 42 in order to control the energization and de-energization thereof.

The various recesses, apertures and passages in the valve 48, and the cam 94 and switch 96, are so relatively positioned (as illustrated in FIGS. 5-11) as to carry out the sequence of operations now to be described.

In its stand-by condition the valve 48 is as shown in FIGS. 5, 6 and 11. The raised portion of the cam 94 engages the switch 96 so as to open the latter, thus deenergizing the motor 42. The pump 40 develops neither pressure nor suction, and rotor passages 84 and 92 communicate with arcuate recess 70 and, through aperture 64, are exposed to the atmosphere. Hence atmospheric pressure is exerted at both the cooking surface 22 and the rim-supporting surface 10 of the utensil.

The liner 24 is dropped into the utensil 2, as shown in FIG. 1. The valve handle 76 is rotated approximately thirty-six degrees. The raised portion of the cam 94 will move away from the switch 96, that switch will close, the motor 42 will be energized, and the pump 40 will be driven, thus developing both pressure and suction. Since in this position of the valve rotor 74, illustrated in FIG. 7, the rotor passage 84 communicates with the aperture 66, atmospheric pressure will still be exerted over the cooking surface 22 of the utensil, and hence between that surface and the body of the liner 24. However, since the rotor passage 92 communicates with suction tube 58b, suction is exerted through the passages 32 opening onto the rim-supporting surface 10 of the utensil. This suction will pull the liner rim 36 down into sealing engagement with the rim-supporting utensil surface 10. The accomplishment of a complete seal around the rim 36 of the liner 24 may be aided by running one's finger over the liner rim 36 and pressing it down against the utensil rim-supporting surface 10. As has previously been mentioned a most effective seal is produced when the lower surface of the liner rim 36 is provided with a deformable sealing coating 38.

Figure 2:
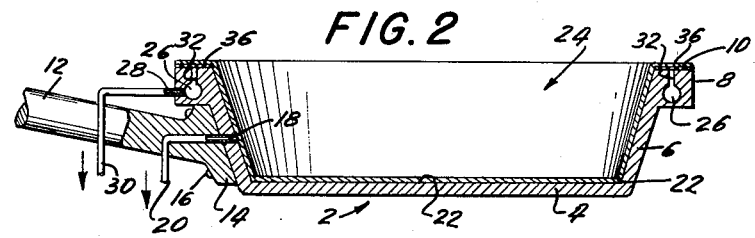
FIG. 2 is a cross-sectional view of the utensil and liner showing the condition of the liner after suction has been completely applied, that condition corresponding to the cooking condition of the combination.
Figure 3:
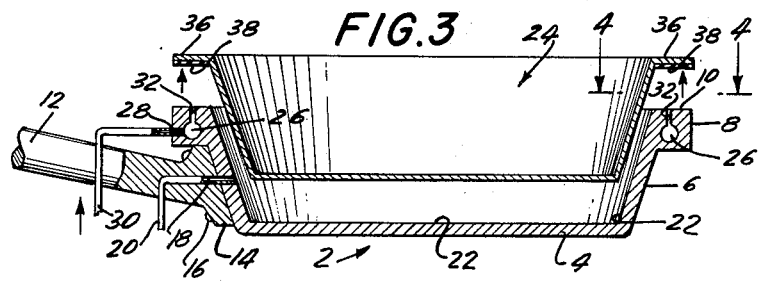
FIG. 3 is a view similar to FIG. 2 but showing, in an exaggerated manner, the separation of the liner from the utensil when pressure is applied thereto.

Next the valve handle 76 is rotated another thirty-six degrees, bringing the valve rotor into the position shown in FIG. 8. Now both of the rotor passages 84 and 92 communicate with the internal valve recess 72 and hence with the suction tube 58b. Thus suction remains active through the passages 32, maintaining the seal between the liner rim 36 and the utensil rim-supporting surface 10, and suction is also applied to the space between the body of the liner 24 and the cooking surface 22 of the utensil, pulling the liner 24 into close engagement and uniform heat transfer relationship with the bottom and side walls 4 and 6 of the utensil (see FIG. 2). The utensil is ready for cooking, and the valve 48 preferably remains in the condition of FIG. 8 during the cooking operation.

After cooking has been completed, or whenever it is desired to remove the liner 24 from the utensil 2, the valve handle 76 is rotated another thirty-six degrees to bring the valve rotor 74 into its position shown in FIG. 9. In this position the valve passage 92 still communicates with the valve recess 72, so that sealing suction is still applied around the rim of the utensil. The rotor passage 84, however, communicates with the valve recess 68, and hence with the pressure pipe 46. Air under pressure is therefore forced between the body of the liner 24 and the cooking surface 22 of the utensil 2, thus forcing the body of the liner 24 away from the utensil surfaces with which it was formerly in contact.

After sufficient separation of the body of the liner 24 from the utensil has been accomplished, the valve handle 76 is rotated another thirty-six degrees to bring the valve rotor into its position shown in FIG. 10. This rotor passage 84 now communicates with the valve recess 70 and, through the aperture 64, with the atmosphere, whereas the rotor passage 92 communicates with the valve recess 68 and hence the pressure tube 46. Pressure is now applied through the utensil passage 26 and auxiliary passages 32 upwardly against the liner rim 36, lifting the liner from the utensil and completing its separation therefrom.

After this has been accomplished the valve handle 76 is rotated another thirty-six degrees to its initial position (FIGS. 5, 6 and 11) in which the cam 94 stops the motor 42 and both of the rotor passages 84 and 92 are connected to atmospheric pressure.

The trap 62 constitutes a safety feature, preventing the suction portion of the pump 40 from sucking fluid or particles into itself in the event that the foil liner 24 should rupture.

Through the use of the arrangement of the present invention foil liners may be used in conjunction with cooking utensils and forced by air pressure into close engagement with the cooking surfaces 22 thereof without requiring the use of mechanical devices such as clamping or sealing rings to ensure that a proper seal is achieved around the periphery of the liner 24. Such a seal is essential, of course, if the body of the liner is to be uniformly drawn into engagement with the utensil cooking surface 22. The manipulations involved in going through an entire cycle of applying a liner, cooking, and removing the liner, are simple in the extreme and are accomplished by means of a single control lever (the valve handle 76) which is moved sequentially in the same direction through a series of stations corresponding to the various operations involved.

While but a single embodiment of the present invention has been here disclosed, many variations may be made therein, both as to structure and mode of functioning, all within the scope of the invention as defined in the following claims.

I claim:

1. In combination, a cooking utensil comprising a body having a cooking surface and a support surface, said support surface surrounding said cooking surface, said utensil having first and second passages through said body communicating respectively with said cooking surface and said support surface, said utensil being adapted to be used in conjunction with removable flexible liners having first portions adapted to cover said cooking surface and second portions adapted to cover said support surface, a source of suction, and means connecting said suction source to said passages, said connecting means including control means effective selectively to connect either one only or both of said passages to said suction source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

2. The combination of claim 1, in which said second passage communicates with said support surface along a plurality of openings separated from one another and spaced along said support surface.

3. In combination, a cooking utensil comprising a body having a cooking surface and a support surface, said support surface surrounding said cooking surface, said utensil having first and second passages through said body communicating respectively with said cooking surface and said support surface, said utensil being adapted to be used in conjunction with removable flexible liners having first portions adapted to cover said cooking surface and second portions adapted to cover said support surface, a source of suction, and means connecting said suction source to said passages, said connecting means including control means effective selectively to connect either said second passage alone or both said passages together to said suction source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

4. The combination of claim 3, in which said second passage communicates with said support surface along a plurality of openings separated from one another and spaced along said support surface.

5. In combination, a cooking utensil comprising a body having a cooking surface and a support surface, said support surface surrounding said cooking surface, said utensil having first and second passages through said body communicating respectively with said cooking surface and said support surface, said utensil being adapted to be used in conjunction with removable flexible liners having first portions adapted to cover said cooking surface and second portions adapted to cover said support surface, a source of suction, a source of atmospheric pressure, and means connecting said suction source and said atmospheric pressure source to said passages, said connecting means including control means effective selectively to connect (a) both of said passages together to said atmospheric pressure source, (b) one of said passages to said atmospheric pressure source and the other of said passages to said suction source, or (c) both of said passages together to said suction source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

6. In the combination of claim 5, driving means for said suction source, and interlock means between said control means and said driving means for de-energizing said driving means when said first control means is in condition (a) and energizing said driving means when said first control means is in condition (b) and (c).

7. In combination, a cooking utensil comprising a body having a cooking surface and a support surface, said support surface surrounding said cooking surface, said utensil having first and second passages through said body communicating respectively with said cooking surface and said support surface, said utensil being adapted to be used in conjunction with removable flexible liners having first portions adapted to cover said cooking surface and second portions adapted to cover said support surface, a source of suction, a source of atmospheric pressure, and means connecting said suction source and said atmospheric pressure source to said passages, said connecting means including control means effective selectively to connect (a) both of said passages together to said atmospheric pressure source, (b) said first passage to said atmospheric pressure source and said second passage to said suction source, or (c) both of said passages together to said suction source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

8. In the combination of claim 7, driving means for said suction source, and interlock means between said control means and said driving means for de-energizing said driving means when said first control means is in condition (a) and energizing said driving means when said first control means is in condition (b) and (c).

9. In combination, a cooking utensil comprising a body having a cooking surface and a support surface, said support surface surrounding said cooking surface, said utensil having first and second passages through said body communicating respectively with said cooking surface and said support surface, said utensil being adapted to be used in conjunction with removable flexible liners having first portions adapted to cover said cooking surface and second portions adapted to cover said support surface, a pressure source, a suction source, a source of atmospheric pressure, and means connecting said sources to said passages, said connecting means including control means for selectively connecting said passages to said sources as follows: (a) both of said passages together to said atmospheric pressure source, (b) one of said passages to said atmospheric pressure source and the other to said suction source, (c) both of said passages together to said suction source, (d) one of said passages to said pressure source, and (e) the other of said passages to said pressure source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

10. In the combination of claim 9, driving means for driving said suction and pressure sources, and interlock means between said control means and said driving means for de-energizing said driving means when said first control means is in condition (a) and energizing said driving means when said first control means is in conditions (b)—(e).

11. The combination of claim 9, in which said control means comprises a manually accessible control member movable in a given direction to sequentially set up conditions (a)—(e).

12. In combination, a cooking utensil comprising a body having a cooking surface surrounded by a support surface and having first and second passages through said body communicating respectively with said cooking surface and said support surface, said utensil being adapted to be used in conjunction with removable flexible liners having first portions adapted to cover said cooking space and second portions adapted to cover said support surface, a pressure source, a suction source, a source of atmospheric pressure, and means connecting said sources to said passages, said connecting means including control means for selectively connecting said passages to said sources as follows: (a) both of said passages together to said atmospheric pressure source, (b) said first passage to said atmospheric pressure source and said second passage to said suction source, (c) both of said passages together to said suction source, (d) said first passage to said pressure source, and (e) said first passage to atmospheric pressure and said second passage to said pressure source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

13. In the combination of claim 12, driving means for driving said suction and pressure sources, and interlock means between said control means and said driving means for de-energizing said driving means when said first control means is in condition (a) and energizing said driving means when said first control means is in conditions (b)—(e).

14. In combination, a cooking utensil comprising a body having a cooking surface surrounded by a support surface and having first and second passages through said body communicating respectively with said cooking surface and said support surface, said utensil being adapted to be used in conjunction with removable flexible liners having first portions adapted to cover said cooking space and second portions adapted to cover said support surface, a pressure source, a suction source, a source of atmospheric pressure, and means connecting said sources to said passages, said connecting means including control means for selectively connecting said passages to said sources as follows: (a) both of said passages together to said atmospheric pressure source, (b) said first passage to said atmospheric pressure source and said second passage to said suction source, (c) both of said passages together to said suction source, (d) said first passage to said pressure source and said second passage to said suction source, and (e) said first passage to atmospheric pressure and said second passage to said pressure source, whereby the application of suction through said passages is transferred to said cooking surface and supporting surface respectively and is adapted to cause said first and second portions of said flexible liners to conform to said cooking surface and said supporting surface respectively, engagement between said second portions of said liners and said supporting surface causing a seal therebetween.

References Cited in the file of this patent

UNITED STATES PATENTS

| | | |
|---|---|---|
| 962,710 | Levin | June 28, 1910 |
| 1,928,424 | Hapgood | Sept. 26, 1933 |
| 2,486,761 | Pfeiffer | Nov. 1, 1949 |
| 2,615,201 | Cloud | Oct. 28, 1952 |
| 2,749,572 | Nowak | June 12, 1956 |
| 2,780,401 | Stevens | Feb. 5, 1957 |
| 2,939,606 | Durbin | June 7, 1960 |